Patented Apr. 28, 1942

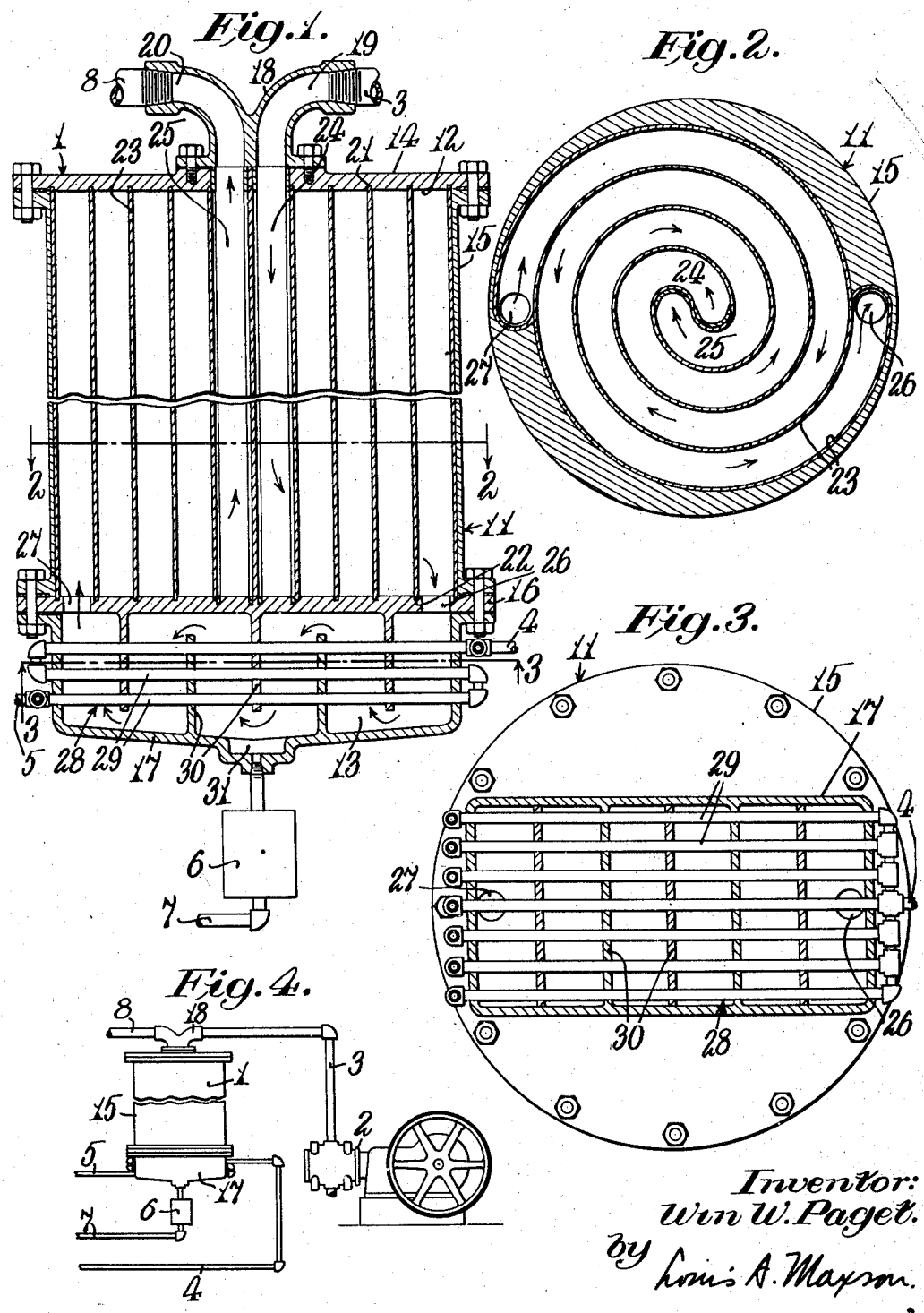

2,281,168

UNITED STATES PATENT OFFICE 2,281,168

GASEOUS FLUID TREATING APPARATUS

Win W. Paget, Long Beach, Michigan City, Ind., assignor to Sullivan Machinery Company, a corporation of Massachusetts Application January 17, 1938, Serial No. 185,312

3 Claims. (Cl. 257—9)

My invention relates to apparatus for treating gases and/or vapors. From one aspect, it relates and may be applied to treatment and separation of binary or complex mixtures of gases of different dew points. From another aspect my invention relates to apparatus for dehumidifying and/or cleansing, without substantial sacrifice of energy, gaseous pressure media. From a further aspect, it relates to apparatus for changing the moisture content, withal with a minimum of temperature change, gaseous heating and/or cooling media. In its many aspects and embodiments and employments it is applicable to the chemical, the air conditioning, and to the compressed air and gas arts, and its applicability to other fields will be obvious.

In the supply of compressed air to air-operated tools and the like it is desirable to remove the moisture and any oil from the air discharged by the compressor before it passes to the tools. All the heat extracted from the air during this operation represents lost energy, however; and it is desirable therefore to remove the oil and separate out the water without reducing the ultimate air or other gaseous medium temperature any more than is essential. Also in air conditioning it may be desirable, under some circumstances, to separate moisture with a minimum change of temperature or perhaps to add moisture with like mode of temperature maintenance. It is also often desirable in certain chemical processes to separate out of binary or complex gaseous mixtures, certain constituents having a different dew point from the remainder, while altering as little as possible the condition and/or state of such remainder.

It is an object of my invention to provide improved means for eliminating a constituent of a complex or at least binary gaseous mixture therefrom, which constituent has a different dew point from others, while maintaining the condition of the residual gas or gases very slightly changed. Another object is to provide an improved heat exchange device. Still another object is to provide an improved heat exchanger and moisture or vapor extractor which operates on an improved principle and with improved results. Other objects and advantages of the invention will hereinafter appear.

In the accompanying drawing, which shows for purposes of illustration one embodiment which my invention may assume in practice, Fig. 1 is a central vertical section through the apparatus;

Fig. 2 is a horizontal section in the plane of the line 2—2 of Fig. 1;

Fig. 3 is a horizontal section in the plane of the line 3—3 of Fig. 1; and

Fig. 4 is a diagrammatic view showing the illustrative embodiment of the invention in use, the scale of the parts of this figure not being uniform throughout.

Referring to the drawing, and first to the diagrammatic view of Fig. 4, it will be noted that the illustrative apparatus is designated 1. To it air under pressure, and at a considerable temperature, as it contains the heat of compression, is delivered by a compressor 2 through the compressor discharge line 3. Cooling water is delivered to the apparatus 1 through a line 4 and is conducted away from it through a line 5. A trap 6 and a discharge line 7 lead off condensed moisture and any oil or other impurities which enter the apparatus 1 with the air. The air at its comparatively elevated temperature enters the apparatus 1, is dehumidified and loses its oil vapors, if any are entrained therein, and issues in an only moderately cooled condition, and with a considerable degree of its original temperature restored to it, through the line 8 which may lead directly to an air user.

The apparatus 1 is designed to effect a progressive giving up of heat by the entering gases to the dehumidified leaving gases, and, at a point when the temperature of the gases to be dehumidified has already been considerably reduced, to subject these gases to direct contact with a suitable cooling unit. The transfer of heat between the entering and leaving gases, since they must be kept separated, involves the provision of as large heat transfer surfaces as may be conveniently practical and, desirably, though not imperatively, thin walls separating the oppositely moving gas streams. By keeping like pressures on opposite sides of the heat transfer walls it is practicable to make these very light, and of material, such as copper, which is especially suited for the purpose. By causing the entering gases to engage the heat transfer wall at a point which is immediately adjacent the point at which the treated gases leave the apparatus, maximum restoration of temperature to the treated gases is possible. Moreover, by subjecting the gases which have been already considerably cooled to the action of a suitable cooling device, the size of this latter may be materially reduced.

Now referring particularly to Figs. 1 to 3 inclusive, it will be observed that a suitable casing 11, made of suitable material and strength to withstand the pressure at which the gases are delivered, comprises an upper, larger compartment 12 and a lower, smaller compartment 13. The casing illustrated comprises a top head 14, a main body portion 15, a dividing wall 16 which forms the lower end of the upper compartment, and a bottom hollow container portion 17. A suitable supply and discharge connection-providing device is mounted, as at 18, on the top of the head 14 and provides passages 19 and 20 respectively for the entering and leaving gases.

The lower side of the head 14 and the top of the wall 16 are correspondingly grooved, as at 21 and 22, and in these grooves, which extend in nested spirals, so to speak, there are disposed suitably curved or bent sheets 23 of appropriate material, such as copper, which coact to provide a spiral inlet passage 24 and a spiral discharge passage 25, each extending closely adjacent the other, and which open through the diametrically spaced passages or ports 26 and 27 into communication, through the wall 16, with the chamber or compartment 13. The outer convolutions of the spiral sheets 23 are supported by the walls of the casing 15. The flow is not wholly counter-flow with the structure specifically shown and described, but is mainly so, and if the advantages of compactness that the nested spirals provide were not sought, a true counter-flow relation could obviously be provided. Within the compartment 13 is a suitable cooling unit 28 herein illustrated as consisting of series of water-conducting pipes 29 and flow-guiding plates 30. A sump 31 receives the condensed liquid and oil and the trap 6 controls its discharge. Obviously the structure shown and described is but illustrative, and many and substantial modifications are possible and contemplated within the scope of the appended claims.

The mode of operation of the apparatus shown and described needs little repetition. The air at a substantial temperature enters at 19, passes through the passage 24 and flows through opening 26 into compartment 13, where it moves, in baffled flow, to the opening 27, then through the spiral passage 25 to the discharge opening 20. As the hottest air enters, it gives up heat to the warmest leaving air. As the entering air drops in temperature it continues to give up heat to the cooler leaving air next to which it is flowing. When substantially cooled, and with some of its moisture already condensing, it flows over the appropriately designed cooler 28 and is further and most effectively dehumidified and has separated from it any entrained oil. The cooled and dehumidified air progressively absorbs heat from the entering air streams through the walls 23, and leaves the discharge opening 20 with considerable heat restored to it, and so with more available energy than would be possible with any ordinary aftercooler. Obviously the apparatus described is applicable to widely varied uses.

The applicability of such an apparatus, modified if desired, to the separation of one constituent from a binary or complex gaseous mixture whose components have different dew points, and the use of such equipment in the air conditioning art, will be clearly understood and obvious to those skilled in these arts, upon a review of what has been said, so that a further description is not essential.

While there are in this application specifically shown and described one form which the invention may assume in practice, it will be understood that this form is presented for purposes of illustration and that the invention may be modified and embodied in various other forms without departing from its spirit or the scope of the appended claims.

What I claim as new and desire to secure by Letters Patent is:

1. In a device for dehumidifying a moisture-laden gas, in combination, means forming a pair of spirally disposed non-communicating passages separated from each other by relatively thin substantially vertical walls, each passage throughout the greater part of its length having the other passage at each of its opposite sides, top inlet means for one of said passages adjacent its axis, top discharge means for the other of said passages adjacent its axis, bottom discharge means for said first passage adjacent its outer end, bottom inlet means for said second passage adjacent its outer end, said bottom discharge means and said bottom inlet means spaced from each other substantially the full width of said device, means forming a compartment connecting said bottom discharge means and said bottom inlet means, and cooling means in said compartment over which fluid passing from said bottom discharge means to said bottom inlet means passes in such transit.

2. In a device for dehumidifying a moisture-laden gas, in combination, a casing having therein means forming a pair of spirally disposed passages separated from each other by relatively thin substantially vertical walls, each passage throughout a substantial portion of its length having the other passage at each of its opposite sides, top inlet means for one of said passages adjacent the axis of its spiral, top discharge means for the other passage adjacent the axis of its spiral, bottom discharge means for said first passage adjacent its outer end, bottom inlet means for said second passage adjacent its outer end, said bottom discharge means and said bottom inlet means substantially diametrically opposite each other with respect to said casing, means secured to the bottom of said casing forming a conduit connecting said bottom discharge and bottom inlet means, cooling means in said conduit, and baffle means in said conduit for lengthening the travel of the gas in contact with said cooling means.

3. In a device for dehumidifying a moisture-laden gas, in combination, a cylindrical casing having therein means forming a pair of spirally disposed passages separated from each other by relatively thin substantially vertical walls, each passage throughout a substantial portion of its length having the other passage at each of its opposite sides, top inlet means for one of said passages adjacent the axis of its spiral, top discharge means for the other passage adjacent the axis of its spiral, bottom discharge means for said first passage adjacent its outer end, bottom inlet means for said second passage adjacent its outer end, said bottom discharge means and said bottom inlet means substantially diametrically opposite each other with respect to said casing, means secured to the bottom of said casing and extending chordally of the latter forming therewith a conduit connecting said bottom discharge and bottom inlet means, cooling means in said conduit extending lengthwise of the latter, and baffle means in said conduit arranged substantially parallel to the axis of said casing for lengthening the travel of the gas in contact with said cooling means.

WIN W. PAGET.